(12) United States Patent
Rajkumar et al.

(10) Patent No.: US 10,579,874 B2
(45) Date of Patent: Mar. 3, 2020

(54) DELEGATION OF OBJECT AND POSE DETECTION

(71) Applicant: X Development LLC, Mountain View, CA (US)

(72) Inventors: Nareshkumar Rajkumar, San Jose, CA (US); Stefan Hinterstoisser, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 16/014,311

(22) Filed: Jun. 21, 2018

(65) Prior Publication Data

US 2018/0300550 A1 Oct. 18, 2018

Related U.S. Application Data

(63) Continuation of application No. 15/212,967, filed on Jul. 18, 2016, now Pat. No. 10,025,984.

(51) Int. Cl.
*G06K 9/00* (2006.01)
*G06K 9/62* (2006.01)
*G06T 7/73* (2017.01)
*G06T 7/33* (2017.01)

(52) U.S. Cl.
CPC ..... *G06K 9/00664* (2013.01); *G06K 9/00979* (2013.01); *G06K 9/6296* (2013.01); *G06T 7/33* (2017.01); *G06T 7/73* (2017.01); *G06T 2207/10021* (2013.01)

(58) Field of Classification Search
None
See application file for complete search history.

(56) References Cited

U.S. PATENT DOCUMENTS 8,984,136 B1 * 3/2015 Francis, Jr. ........... H04W 4/029
709/226
9,473,594 B1 10/2016 Hickman et al.
(Continued)

OTHER PUBLICATIONS

CORE: A Cloud-based Object Recognition Engine for Robotics. Beski et al.Jul. 2005.*
(Continued)

*Primary Examiner* — Delomia L Gilliard
(74) *Attorney, Agent, or Firm* — Middleton Reutlinger

(57) ABSTRACT

Methods, apparatus, systems, and computer-readable media are provided for delegating object type and/or pose detection to a plurality of "targeted object recognition modules." In some implementations, a method may be provided that includes: operating an object recognition client to facilitate object recognition for a robot; receiving, by the object recognition client, sensor data indicative of an observed object in an environment; providing, by the object recognition client, to each of a plurality of remotely-hosted targeted object recognition modules, data indicative of the observed object; receiving, by the object recognition client, from one or more of the plurality of targeted object recognition modules, one or more inferences about an object type or pose of the observed object; and determining, by the object recognition client, information about the observed object, such as its object type and/or pose, based on the one or more inferences.

20 Claims, 5 Drawing Sheets

(56) References Cited

U.S. PATENT DOCUMENTS

| | | |
|---|---|---|
| 2008/0313119 A1 | 12/2008 | Leskovec et al. |
| 2015/0098614 A1 | 4/2015 | Gee et al. |

OTHER PUBLICATIONS

Robotic Object Detection: Learning to Improve the Classifiers Using Sparse Graphs for Path Planning. Jia et al. May 2011.*

International Search Report and Written Opinion of PCT Ser. No. PCT/US2017/042455 17 pages dated Dec. 8, 2017.

McCormac, John B. "3D Object Detection for Mobile Robots." Submitted in Partial Fulfilment of the Requirements for the MSc Degree in Computing Science of Imperial College London. Sep. 2, 2014. 70 pages.

Beksi, William J., John Spruth, and Nikolaos Papanikolopoulos. "CORE: A Cloud-Based Object Recognition Engine for Robotics." In Intelligent Robots and Systems (IROS), 2015 IEEE/RSJ International Conference on, pp. 4512-4517. IEEE, Sep. 28, 2015.

Lai, Kevin, and Dieter Fox. "Object Recognition in 3D Point Clouds Using Web Data and Domain Adaptation." The International Journal of Robotics Research 29, No. 8 (2010): 1019-1037.

Burski, Bartłomiej, and Piotr Garbacz. "The Use of Cloud Computing in Mobile Robotics." Problemy Eksploatacji (2014). 12 pages.

Kehoe, Ben, Akihiro Matsukawa, Sal Candido, James Kuffner, and Ken Goldberg. "Cloud-Based Robot Grasping with the Google Object Recognition Engine." In Robotics and Automation (ICRA), 2013 IEEE International Conference on, pp. 4263-4270.

Jensfelt, Patric, Staffan Ekvall, Danica Kragic, and Daniel Aarno. "Augmenting Slam with Object Detection in a Service Robot Framework." In ROMAN 2006—The 15th IEEE International Symposium on Robot and Human Interactive Communication, pp. 741-746. IEEE, 2006.

Chamberlain, William, Thomas Drummond, and Peter Corke. "Distributed Robotic Vision as a Service." In Australasian Conference on Robotics and Automation (Robert Mahony Dec. 2, 2015 to Dec. 4, 2015), pp. 1-9. The Australian National University, 2015.

Jia Z, Saxena A, Chen T. Robotic object detection: Learning to improve the classifiers using sparse graphs for path planning. InIJCAI Proceedings—International Joint Conference on Artificial Intelligence Jul. 16, 2011 (vol. 22, No. 3, p. 2072); 7 pages.

European Patent Office; Invitation to Pay Additional Fees in International Patent Application No. PCT/US2017/042455; 15 pages; dated Oct. 9, 2017.

European Patent Office; International Preliminary Report on Patentability of PCT Ser. No. PCT/US2017/042455; 12 pages; dated Jan. 31, 2019.

* cited by examiner

DELEGATION OF OBJECT AND POSE DETECTION

BACKGROUND

Object and pose recognition are fundamental aspects of robot operation. However these operations tend to be resource-intensive and robots are typically resource-constrained. A general purpose robot may be called upon to act upon a plethora of different object types in myriad poses. It may not be feasible for the robot to store locally all of the object models and/or other data/routines needed to classify all possible objects and respective possible poses. Moreover, applying a large number of object models to each unclassified object observed in an environment may overwhelm the robot's resources, e.g., causing the robot to behave sluggishly, unresponsively, and/or erratically.

SUMMARY

The present disclosure is generally directed to methods, apparatus, and computer-readable media (transitory and non-transitory) for delegating object type and/or pose detection to a plurality of "targeted object recognition modules." In various implementations, sensor data obtained from sensors such as two-dimensional ("2D") or three-dimensional ("3D") cameras may reveal the presence of one or more observed objects in a robot's environment. These observed objects may have object types and/or poses that are unknown. Rather than attempt to ascertain the object types and/or poses itself, a "object recognition client" that operates on the robot or on a computing system (e.g., a desktop computer, router, etc.) that is considered "local" to the robot (e.g., in the same building, at least partially controls robot operation, etc.) may provide data indicative of the one or more observed objects (e.g., sensor data) to a plurality of targeted object recognition modules, e.g., via a so-called "root object recognition server." Each targeted object recognition module may be operated and/or used to analyze the data indicative of the one or more observed objects and provide one or more "inferences" about the one or more observed objects. These "inferences" may include, for instance, a "best guess" of an object's type (e.g., "cup," "plate," "telephone," etc.) and/or pose. Based on inferences it receives from the plurality of targeted object recognition modules, the object recognition client may determine information about the one or more observed objects, such as their object types and/or poses.

Targeted object recognition modules may take various forms. In some implementations, the targeted object recognition modules may include object models (e.g., CAD-based) that may be used to classify object types/poses, e.g., using vision and/or depth data obtained by one or more vision sensors. In other implementations, the targeted object recognition modules may take the form of 2D patterns or profiles of objects that may be matched to portions of 2D image data (e.g., video frames) captured by one or more vision sensors. In yet other implementations, the targeted object recognition modules may include routines (e.g., state machines) that may be implemented/triggered by the object recognition client to provide inferences about object type and/or pose.

In some implementations, the plurality of targeted object recognition modules may be selected from a library of candidate targeted object recognition modules (which may be hosted locally on or near the robot, and/or in the so-called "cloud") based on various signals. These signals may include, for instance, attributes of a task to be performed by a robot. Suppose a robot is instructed to clear a kitchen table. When performing such a task, the robot is likely to encounter objects typically found in kitchens, such as dishware, cups, silverware, napkins, cutlery, and so forth. The robot is less likely to encounter non-kitchen-related objects such as power tools, cleaning supplies, electronics, etc. Accordingly, one or more targeted object recognition modules that facilitate recognition/classification of kitchen-related objects may be selected from the library of candidate targeted object recognition modules. Selection of the targeted object recognition modules may be performed by the object recognition client and/or by the root object recognition server that may operate locally on or near the robot, and/or on the cloud. Other signals may be used to select targeted object recognition modules as well, such as a robot's position and/or sensor data obtained by or on behalf of the robot.

In various implementations, the multiple inferences about observed objects in the environment may be provided, e.g., to the object recognition client and/or to the root object recognition server. Some of these inferences may conflict with each other. For example, one targeted object recognition module may infer that a particular observed object is a cup and another targeted object recognition module may infer that the same observed object is a bowl. In various implementations, the object recognition client and/or root object recognition server may select from the multiple competing inferences based on a variety of signals, such as a confidence measure associated with each classification, a time required to obtain each classification (longer processing times may indicate less certainty, and/or waiting for such processing to complete may stall robot operation), and so forth.

In some scenarios, there may be multiple objects observed in an environment for which a robot may need to determine information such as an object type and/or pose. As noted above, multiple targeted object recognition modules may provide competing inferences for a single observed object, creating conflicts. Sometimes a conflict may arise when an object/type or pose inferred for one observed object would collide (e.g., occupy at least some of the same space as) an object type/pose inferred for another observed object. In scenarios in which there are multiple conflicts pertaining to multiple observed objects, and some of those conflicts arise from collisions between inferred object types/poses, the object recognition client may use various techniques to "best guess" object types and/or poses of the multiple observed objects.

In some implementations, the object recognition client and/or root object recognition server may identify a graph of nodes. Each node may represent an inference about an object type or pose of one of the multiple observed objects. At least a subset of nodes of the graph may be connected to each by one or more edges. Each edge may indicate a lack of collision between inferences represented by the nodes it connects. A different subset of nodes of the graph may not be connected by edges due to a collision between inferences represented by the different subset of nodes. In some implementations, the "maximum clique," or the subgraph having the most nodes that are connected to (and therefore represent object types or poses that do not collide with) all other nodes in the subgraph, may be identified. This subgraph may represent a best approximation as to what object types/poses are represented among multiple observed objects in an environment.

In some implementations, a computer implemented method may be provided that includes the steps of: operating, by one or more processors, an object recognition client to facilitate object recognition for a robot; receiving, by the object recognition client, sensor data indicative of an observed object in the environment; providing, by the object recognition client, to each of a plurality of targeted object recognition modules hosted remotely from the one or more processors, data indicative of the observed object; receiving, by the object recognition client, from one or more of the plurality of targeted object recognition modules, one or more inferences about an object type or pose of the observed object; and determining, by the object recognition client, information about the observed object based on the one or more inferences.

This method and other implementations of technology disclosed herein may each optionally include one or more of the following features. In various implementations, sensor data may include a point cloud captured by a stereoscopic camera. In various implementations, data indicative of the observed object that is provided to at least one of the plurality of targeted object recognition modules may include at least a subset of the sensor data. In various implementations, the providing may include providing the data indicative of the observed object to a root object recognition server operating remotely from the one or more processors. In various implementations, the root object recognition server may select the plurality of targeted object recognition modules from a library of targeted object recognition modules, and provides data indicative of the observed object to each of the selected targeted object recognition modules.

In various implementations, the determining may include selecting from a plurality of inferences about the object type or pose received from the plurality of targeted object recognition modules based on one or more signals. In various implementations, the one or more signals may include a confidence measure associated with at least one of the plurality of inferences. In various implementations, the one or more signals may include a processing time associated with at least one of the plurality of targeted object recognition nodes. In various implementations, the one or more signals may include one or more expected object types or poses associated with a task to be performed by the robot.

In various implementations, the receiving may include receiving sensor data indicative of multiple observed objects in the environment. In various implementations, the one or more inferences may include a plurality of inferences about object types or poses of the multiple observed objects. In various implementations, the method may further include identifying, by the object recognition client, a graph of nodes, wherein each node represents an inference about an object type or pose of one of the multiple observed objects. In various implementations, at least a subset of nodes of the graph may be connected to each other by one or more edges, and wherein each edge indicates a lack of collision between inferences represented by nodes that the edge connects. In various implementations, at least a different subset of nodes of the graph may not be connected by edges due to one or more collisions between inferences represented by the different subset of nodes. In various implementations, the determining may include: identifying a maximum clique of connected nodes in the graph; and determining object types or poses of the multiple observed objects based on inferences represented by the maximum clique of connected nodes.

In another aspect, a computer-implemented method may include: operating an object recognition client to perform object recognition for a robot; receiving, by the object recognition client, sensor data indicative of an observed object in the environment; providing, by the object recognition client, to each of a plurality of targeted object recognition modules, data indicative of the observed object, wherein the plurality of targeted object recognition modules are selected based at least in part on the sensor data; receiving, by the object recognition client, from one or more of the plurality of targeted object recognition modules, one or more inferences about an object type or pose of the observed object; and determining, by the object recognition client, information about the observed object based on the one or more inferences.

In yet another aspect, a computer-implemented method may include: receiving, from an object recognition client that facilitates object recognition for a robot, data indicative of an observed object; providing, to each of a plurality of targeted object recognition modules, at least a subset of the data indicative of the observed object; receiving, from one or more of the plurality of targeted object recognition modules, one or more inferences about an object type or pose of the observed object; and providing at least some of the one or more inferences to the object recognition client. In some implementations, the one or more inferences may include a plurality of inferences about object types or poses of multiple observed objects. In some such implementations, the method may further include: identifying a graph of nodes, wherein each node represents an inference about an object type or pose of one of the multiple observed objects, at least a subset of nodes of the graph are connected to each other by one or more edges, and each edge indicates a lack of collision between inferences represented by nodes that the edge connects; and identifying a maximum clique of connected nodes in the graph. In some implementations, providing at least some of the one or more inferences to the object recognition client may include providing inferences represented by the maximum clique of connected nodes.

Other implementations may include a non-transitory computer readable storage medium storing instructions executable by a processor to perform a method such as one or more of the methods described above. Yet other implementations may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
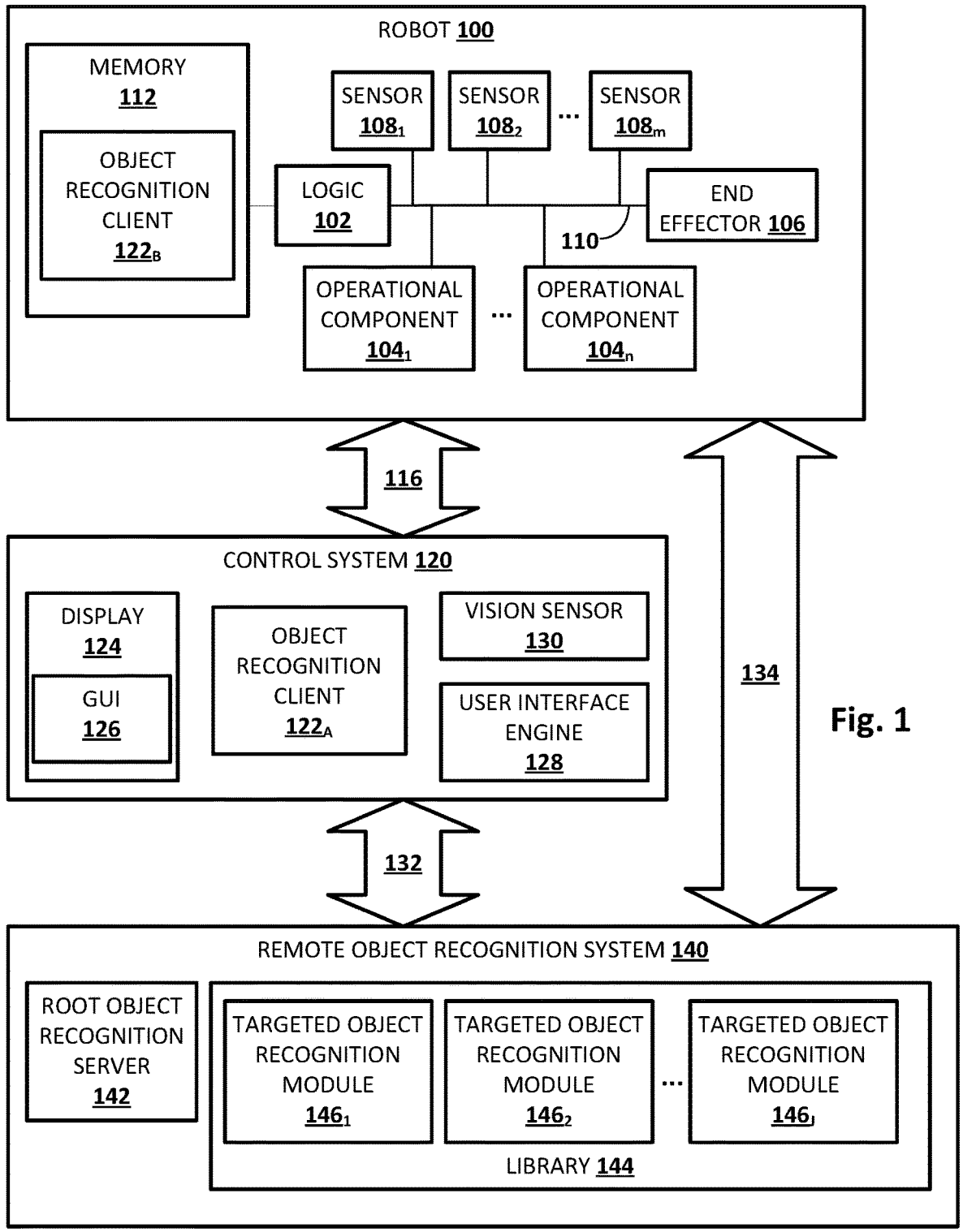
FIG. 1 schematically depicts an example environment in which disclosed techniques may be employed, in accordance with various implementations.

FIG. 1 is a schematic diagram of an example environment in which selected aspects of the present disclosure may be practiced in accordance with various implementations. A robot 100 may be locally controlled in whole or in part by a control system 120. Robot 100 may take various forms, including but not limited to a telepresence robot (e.g., which may be as simple as a wheeled vehicle equipped with a display and a camera), a robot arm, a humanoid, an animal, an insect, an aquatic creature, a wheeled device, a submersible vehicle, an unmanned aerial vehicle ("UAV"), and so forth. In various implementations, robot 100 may include logic 102. Logic 102 may take various forms, such as a real time controller, one or more processors, one or more field-programmable gate arrays ("FPGA"), one or more application-specific integrated circuits ("ASIC"), and so forth. In some implementations, logic 102 may be operably coupled with memory 112. Memory 112 may take various forms, such as random access memory ("RAM"), dynamic RAM ("DRAM"), read-only memory ("ROM"), Magnetoresistive RAM ("MRAM"), resistive RAM ("RRAM"), NAND flash memory, and so forth.

In some implementations, logic 102 may be operably coupled with one or more operational components $104_{1-n}$, one or more end effectors 106, and/or one or more sensors $108_{1-m}$, e.g., via one or more buses 110. As used herein, an "operational component" 104 of a robot may broadly refer to actuators, motors (e.g., servo motors), joints, shafts, gear trains, pumps (e.g., air or liquid), pistons, drives, or other components that may create and/or undergo propulsion, rotation, and/or motion. Some operational components 104 may be independently controllable, although this is not required. In some instances, the more operational components robot 100 has, the more degrees of freedom of movement it may have.

As used herein, "end effector" 106 may refer to a variety of tools that may be operated by robot 100 in order to accomplish various tasks. For example, some robots may be equipped with an end effector 106 that takes the form of a claw with two opposing "fingers" or "digits." Such as claw is one type of "gripper" known as an "impactive" gripper. Other types of grippers may include but are not limited to "ingressive" (e.g., physically penetrating an object using pins, needles, etc.), "astrictive" (e.g., using suction or vacuum to pick up an object), or "contigutive" (e.g., using surface tension, freezing or adhesive to pick up object). More generally, other types of end effectors may include but are not limited to drills, brushes, force-torque sensors, cutting tools, deburring tools, welding torches, containers, trays, and so forth. In some implementations, end effector 106 may be removable, and various types of modular end effectors may be installed onto robot 100, depending on the circumstances.

Sensors 108 may take various forms, including but not limited to 3D laser scanners or other 3D vision sensors (e.g., stereographic cameras used to perform stereo visual odometry) configured to provide depth measurements, 2D cameras, light sensors (e.g., passive infrared), force sensors, pressure sensors, pressure wave sensors (e.g., microphones), proximity sensors (also referred to as "distance sensors"), depth sensors, torque sensors, barcode readers, radio frequency identification ("RFID") readers, radars, range finders, accelerometers, gyroscopes, compasses, position coordinate sensors (e.g., global positioning system, or "GPS"), speedometers, edge detectors, and so forth. While sensors $108_{1-m}$ are depicted as being integral with robot 100, this is not meant to be limiting. In some implementations, sensors 108 may be located external to, but may be in direct or indirect communication with, robot 100, e.g., as standalone units or as part of control system 120.

Control system 120 may include one or more computing systems connected by one or more networks (not depicted) that control operation of robot 100 to various degrees. An example of such a computing system is depicted schematically in FIG. 5. In some implementations, control system 120 may be operated by a user (not depicted) to exert a relatively high level of control over robot 100, e.g., in real time in response to signals received by a user interface engine 128 and/or one or more readings from one or more sensors 108. In other implementations, control system 120 exerts less direct control over robot 100. For example, control system 120 may provide robot 100 with a high level task such as "go to location, identify person, follow person." Logic 102 on robot 100 may convert such high level tasks into robot action, e.g., by translating one or more high level tasks into a plurality of motion primitives executable by robot 100. In some implementations, control system 120 may include a display 124 (e.g., CRT, LCD, touchscreen, etc.) on which a graphical user interface 126 operable to remotely control robot 100 may be rendered.

As noted above, control system 120 may be considered "local" to robot 100. For example, if robot 100 is deployed in a home, control system 120 may be implemented in or near the home on one or more home computers (desktop or laptop), tablet computers, smart phones, smart routers, home servers, smart watches, set top boxes, and so forth. Similarly, if robot 100 is deployed in a manufacturing and/or commercial setting, control system 120 may be implemented on one or more computing devices having one or more of the aforementioned form factors that is in or near the commercial setting. More generally, to be considered "local" to robot 100, a computing device may be in communication with robot 100 through one or more personal area networks ("PANs") and/or local area networks ("LANs"). Put another way, resources are considered "local" to robot 100 when they are available when robot 100 and/or control system 120 are "offline," e.g., not connected to the Internet. Of course, techniques described herein are not limited to control systems that are in communication with robot 100 using LANs or PANs. Assuming sufficient bandwidth and acceptable latency, techniques described herein may be implemented using a control system 120 that is in communication with robot 100 over one or more wide area networks ("WAN") such as the Internet.

Control system 120 and robot 100 may communicate via one or more communication channels 116. Communication channels 116 may utilize various wired and/or wireless communication technologies typically utilized over short to medium ranges, e.g., in PANs and/or LANs. For example, in some implementations, communication channel 116 may include one or more PANs employing technologies such as Bluetooth, Wireless universal serial bus ("USB"), Z-Wave, Zigbee, Infrared Data Association ("IrDA"), INSTEON, and so forth. Additionally or alternatively, in some implementations, communication channel 116 may employ one or more technologies typically associated with LANs, such as Wi-Fi (IEEE 802.11), Ethernet (IEEE 802.3), and so forth.

Various modules or engines may be implemented as part of control system 120 as software, hardware, or any combination of the two. For example, in FIG. 1, control system 120 includes an object recognition client $122_A$, the aforementioned display 124 and user interface engine 128, and a vision sensor 130. Vision sensor 130 may take various forms, such as a 3D laser scanner or other 3D vision sensor (e.g., stereographic camera used to perform stereo visual odometry) configured to provide depth measurements, a 2D camera, and so forth.

While robot 100 and control system 120 are depicted separately in FIG. 1, this is not meant to be limiting. In various implementations, one or more aspects (e.g., modules, engines, etc.) depicted in FIG. 1 as implemented on one of robot 100 or control system 120 may be implemented on the other, may be distributed across both, and/or may be distributed across one or both in combination with other components not depicted in FIG. 1. For example, robot 100 may operate another instance of object recognition client $122_B$ in memory 112, which may compliment, supplement, or may even replace the first instance of object recognition client $122_A$ that operates on control system 120. In some implementations, control system 120 may be implemented entirely or in part using logic 102 of robot 100.

Remote object recognition system 140 may include one or more computing systems connected by one or more networks (not depicted) that provide object recognition services to one or more robots, including robot 100. An example of such a computing system is depicted schematically in FIG. 5. Robot 100 and/or control system 120 may be in communication with remote object recognition system 140, e.g., over connection 132 and/or 134. Connections 132 and/or 134 may be implemented using any wired or wireless technologies typically associated with WAN communication, such as through one or more connected LANs, cellular (e.g., 3G, 4G and beyond), T1, Ethernet, DSL, and so forth.

Various modules or engines may be implemented as part of remote object recognition system 140 as software, hardware, or any combination of the two. For example, in FIG. 1, remote object recognition system 140 includes a root object recognition server 142 and a library 144 of targeted object recognition modules $146_{1-J}$. Library 144 may come in the form of one or more databases or other similar data structures suitable for storing targeted object recognition modules 146. Root object recognition server 142 may have access to library 144 and, as will be discussed in more detail below, may be configured to select one or more targeted object recognition modules 146 to process data indicative of an object observed in an environment in which robot 100 operates, and to provide inferences about a pose and/or object type of the observed object.

Targeted object recognition modules $146_{1-J}$ may take various forms. In some implementations, targeted object recognition modules 146 may include object models (e.g., computer-aided design, or "CAD", based) that may be used and/or triggered to classify object types/poses, e.g., using vision and/or depth data obtained by one or more vision sensors (e.g., 108, 130). In other implementations, targeted object recognition modules $146_{1-J}$ may take the form of 2D patterns or profiles of objects that may be matched to portions of 2D image data (e.g., video frames) captured by one or more vision sensors (e.g., 108, 130). In yet other implementations, targeted object recognition modules $146_{1-J}$ may include routines (e.g., state machines) that may be implemented/triggered by object recognition client 122 (122A or 122B) to provide inferences about object type and/or pose.

While library 144 of targeted object recognition modules $146_{1-J}$ is depicted as being hosted remotely from robot 100 and control system 120, this is not meant to be limiting. Library 144 may additionally or alternatively include targeted object recognition modules 146 hosted locally on robot 100 and/or control system 120. For example, in some implementations, often-used targeted object recognition modules 146 may be hosted locally on robot 100 and/or control system 120. Moreover, in some implementations, root object recognition server 142 may be operated whole or in part on robot 100 and/or control system 120.

In various implementations, object recognition client 122 (hereinafter, any operation described as performed by object recognition client 122 may be performed by 122A or 122B) may be configured to receive, e.g., from one or more sensors 108 and/or vision sensor 130, sensor data indicative of an observed object in an environment in which robot 100 operates or will operate. The sensor data may reveal one or more observed objects in the environment with object types and poses that may be unknown.

Object recognition client 122 then may provide, to each of a plurality of targeted object recognition modules 146, e.g., hosted remotely from robot 100 and/or control system 120 at remote object recognition system 140 and/or locally at robot 100 and/or control system 120, data indicative of the observed object. In some implementations, object recognition client 122 may select and provide the data to targeted object recognition modules 146 individually. In other implementations, object recognition client 122 may provide the data indicative of the observed object(s) to root object recognition server 142. As will be described below, root object recognition server 142 may then select targeted object recognition modules 146 to receive and process the data and provide one or inferences about an object type and/or pose of the observed object(s). Other variations are contemplated herein.

The data indicative of the observed one or more objects that object recognition client 122 provides (directly or indirectly) to multiple targeted object recognition modules 146 may take various forms. In some implementations, the data indicative of the observed one or more objects may include at least a subset of the sensor data. For example, in some implementations, one or more sensors 108 and/or vision sensor 130 may provide a so-called "point cloud" that includes, for instance, a color value and depth for each observed point. object recognition client 122 may provide all or a selected subset of the point cloud to each selected targeted object recognition module 146 directly, or to root object recognition server 142, which in turn may select targeted object recognition modules 146 to receive and process the data. The same may be true for 2D sensor data.

In other implementations, the data indicative of the observed one or more objects may include a so-called "soft classifier." For example, object recognition client 122 may include functionality to approximately classify an object's type and/or pose using its limited resources, e.g., with a relatively low level of confidence. In some implementations, object recognition client 122 may calculate a soft classifier for an observed object based on data other than observed attributes of the object, such as a location of the object and/or robot 100. For instance, object recognition client 122 may be more likely to guess that an observed object is a tool if the object is located in a garage. A robot's location may be determined in various ways, such as using global position system ("GPS") coordinates, inertial measurement units ("IMU"), or various triangulation techniques that leverage one or more wireless connections of robot 100. Based on the soft classifier, object recognition client 122 and/or root object recognition server 142 may select one or more targeted object recognition modules 146 from library 144.

In some implementations, object recognition client 122 may provide root object recognition server 142 with multiple soft-classifiers for a particular observed object (e.g., multiple object types or poses that the object could potentially match), and root object recognition server 142 may select multiple targeted object recognition modules 146 that correspond to the multiple soft-classifiers. In some implementations, object recognition client 122 may provide root object recognition server 142 with other information in addition to or instead of soft-classifiers. For example, object recognition client 122 may provide root object recognition server 142 with a location of the observed object or robot 100 (which may be determined as described above). If root object recognition server 142 determines from the received location data that robot 100 or the observed object is in a garage, root object recognition server 142 may be more likely to select targeted object recognition modules 146 that are configured to provide inferences about types and/or poses of tools. If root object recognition server 142 determines from the received location data that robot 100 or the observed object is in a kitchen, root object recognition server 142 may be more likely to select targeted object recognition modules 146 that are configured to provide inferences about types and/or poses of items typically found in kitchens, such as cutlery, dishware, etc.

Each targeted object recognition module 146 that is selected by object recognition client 122 and/or root object recognition server 142 may be used process the data indicative of the observed object(s) in the environment of robot 100 in various ways. As was noted above, in some implementations, each targeted object recognition module 146 may be a self-contained state machine, e.g., such as a web service, that can be triggered, provided with input and then can provide output (e.g., an inference about a pose and/or object type of an observed object).

In some implementations, each targeted object recognition module 146 may include an object model associated with a particular object type and/or pose that the module is configured to provide an inference about. Such targeted object recognition modules may be self-contained state machines, or may simply be models that are utilized by other processes (e.g., cloud-based or hosted on control system 120/robot 100) that provide inferences based on the models and data indicative of observed objects provided by object recognition client 122.

However targeted object recognition modules 146 are used to process the data indicative of the observed object(s), object recognition client 122 and/or root object recognition server 142 may receive, e.g., from one or more of the plurality of targeted object recognition modules 146, one or more inferences about an object type or pose of the observed object(s). Based on the one or more inferences, object recognition client 122 and/or root object recognition server 142 may determine information about the observed object, such as its object type and/or pose. In implementations in which root object recognition server 142 determines the object type or pose, it may simply provide the result to object recognition client 122.

Figure 2:
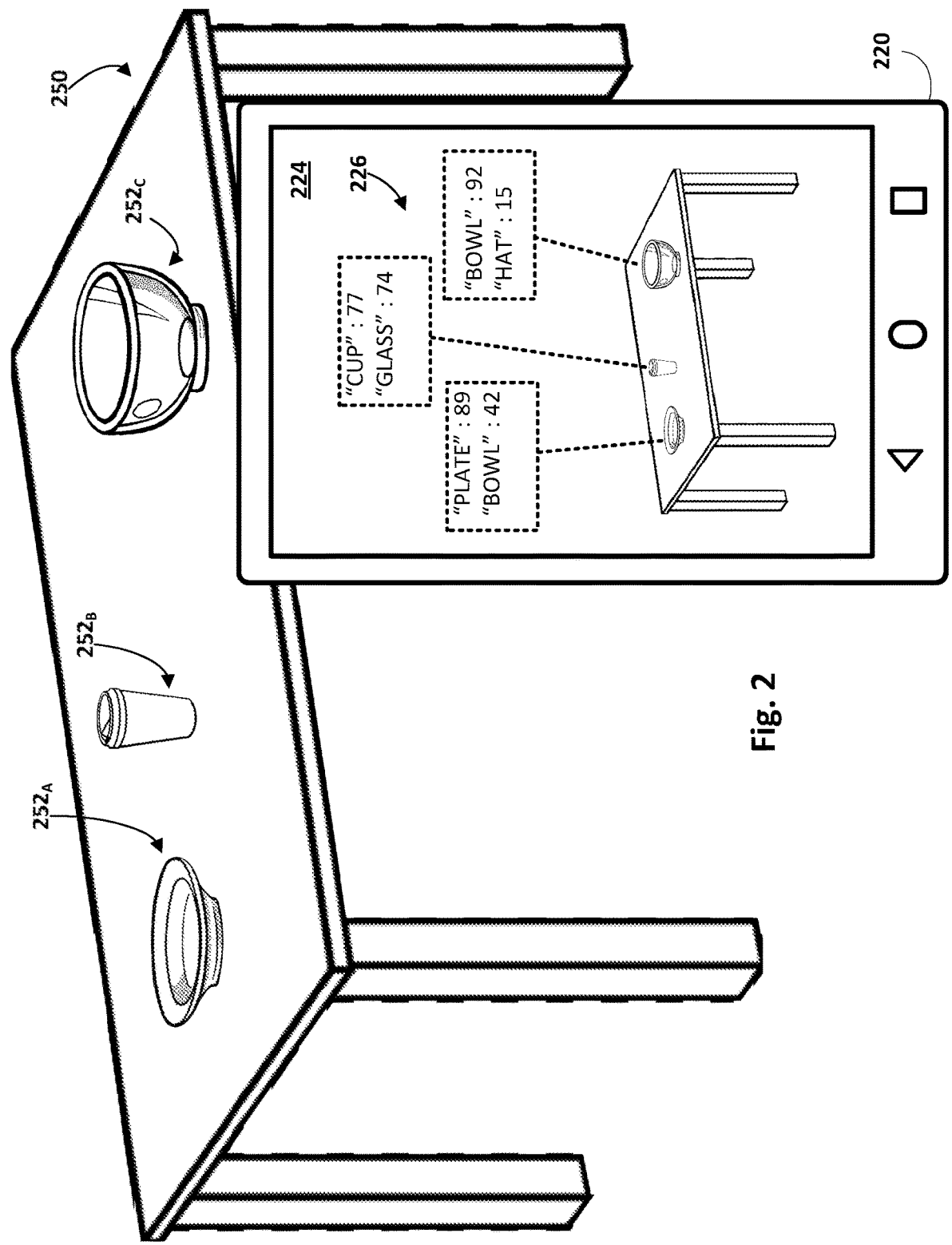
FIG. 2 depicts one example of how disclosed techniques may be practiced, in accordance with various implementations.

FIG. 2 depicts an example scenario in which an environment in which a robot (not depicted) operates includes a table 250 with three objects $252_{A-C}$ on top. The environment appears to be a kitchen or dining area based on the fact that the three objects $252_{A-C}$ take the form of a plate, a cup, and a bowl. In this example, a user (not depicted) controls the robot using a control system 220 in the form of a tablet computer. Control system 220 includes a display 224 in the form of a touchscreen, and at least a front-facing camera (not visible) that is currently capturing in its field of view table 250 and objects $252_{A-C}$. A graphical user interface 226 is rendered on display 224 that depicts the field of view of the camera, and hence depicts table 250 and objects $252_{A-C}$.

Using techniques described herein, control system 220, e.g., by way of an object recognition client (not depicted in FIG. 2, see 122A in FIG. 1) executing thereon, has obtained inferences from a plurality of targeted object recognition modules ($146_{1-J}$ in FIG. 1) about object types of objects $252_{A-C}$. These inferences are displayed as part of graphical user interface 226. For example, first object $252_A$ has been inferred to be either a plate or a bowl. These inferences are accompanied by confidence measures that indicate how confident the respective targeted object recognition module 146 is about its inference. For example, one targeted object recognition module 146 configured to identify plates has identified first object $252_A$ as a plate with a confidence measure of 89 (out of 100). Another targeted object recognition module 146 configured to identify bowls has identified first object $252_A$ as a bowl with a much lower confidence measure of 42. Based on these confidence measures, object recognition client 122A (which may be executing on control system 220) and/or root object recognition engine 142 may determine that first object $252_A$ is most likely a plate.

While confidence measures depicted in FIG. 2 are within the range of 0-100, this is not meant to be limiting. Confidence measures may fall within various types of ranges, such as 0-1, or any other range. And while the inferences and respective confidence measures are visibly rendered on display 224, this is not required. In many cases, these inferences and confidence measures may be used "under the hood" by object recognition client 122 (122A on control system 120/220 or 122B on robot 100) and/or root object recognition engine 142 to determine object types/poses, without displaying anything to a user. Graphical user interface 226 of FIG. 2 may be used, for instance, to debug robot operation and/or to demonstrate to a user how objects are being classified, and is being used here to demonstrate disclosed techniques.

Second object $252_B$ in FIG. 2 has been alternately inferred to be a cup (with a confidence measure of 77) and a glass (with a confidence measure of 74). In some implementations, because the confidence value associated with the inference of cup is slightly greater than the confidence value associated with the inference of glass, object recognition client 122 and/or root object recognition engine 142 may simply determine that second object $252_B$ is a cup. However, because the confidence measures are so close, in some implementations, object recognition client 122 and/or root object recognition engine 142 may take additional actions to attempt to disambiguate between the two conflicting inferences.

For example, in some implementations, object recognition client 122 and/or root object recognition engine 142 may obtain additional information from one or more sensors 108 to attempt to obtain a more accurate inference about second object $252_B$. In other implementations, object recognition client 122 and/or root object recognition engine 142 may utilize other signals to disambiguate between conflicting inferences. For example, object recognition client 122 and/or root object recognition engine 142 may take into account the time of day (e.g., morning) to determine that second object $252_B$ is more likely a paper coffee cup than a glass. In other implementations, object recognition client 122 and/or root object recognition engine 142 may consult with an object inventory associated with an operator of a robot to determine that the operator does not own a glass matching the "glass" inference, and therefore the "cup" inference must be correct.

In yet other implementations, object recognition client 122 and/or root object recognition engine 142 may use canonical models associated with each inference, such as computer aided designs ("CAD") associated with cups and glasses, to render one or more canonical cups and glasses. In some instances these canonical objects may be rendered in poses inferred by targeted object recognition modules 146 (e.g., in addition to inferred object types). Object recognition client 122 and/or root object recognition engine 142 may then compare sensor data depicting second object 252B (e.g., 2D camera data) with each rendered canonical model to detect a closest match. The closest match may be used to resolve the conflict between the cup and glass inferences. In some implementations, shapes of the canonical models may be used to disambiguate between multiple conflicting inferences. In some implementations, other characteristics of the canonical models, such as colors, opaqueness, transparency, reflectiveness, etc., may be used to disambiguate between multiple conflicting inferences. For example, a canonical model of a paper coffee cup may indicate that the cup is opaque and/or has a flat (i.e. "matte"), non-reflective surface. By contrast, a canonical model of a glass may indicate that the glass is transparent and/or has a reflective surface.

Third object $252_C$ in FIG. 2 has been alternately inferred to be a bowl (with a confidence measure of 92) and a hat (with a confidence measure of 15). While not depicted in FIG. 2, the "hat" inference may be coupled with an inference about its pose, such as that the hat is upside down. In some implementations, because the confidence value associated with the inference of bowl is much greater than the confidence value associated with the inference of hat, object recognition client 122 and/or root object recognition engine 142 may simply determine that third object $252_C$ is a bowl.

In many scenarios, robot 100 may encounter multiple objects in an environment that it may act upon. For example, robot 100 and/or control system 120/220 may receive sensor data indicative of multiple observed objects in the environment. Multiple inferences may be received about poses and/or object types of the multiple observed objects. As noted above, some of these inferences may conflict. For example, two or more distinct object type inferences and/or pose inferences may be provided for a single observed object. FIG. 2 and the accompanying description demonstrated some techniques for resolving conflicts between two competing inferences about a single object. However, in some implementations, competing inferences may be resolved based on inferences associated with other objects in the environment. An example of this is depicted in FIGS. 3A-C.

Figure 3A:
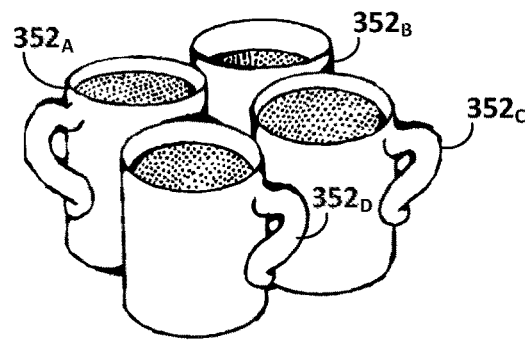
FIGS. 3A, 3B, and 3C depict examples of how disclosed techniques may be practiced, in accordance with various implementations.
Figure 3B:
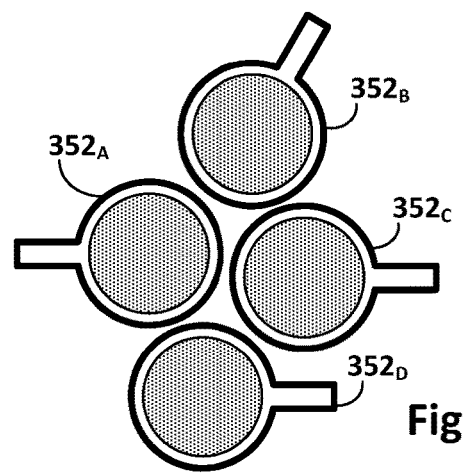
Figure 3C:
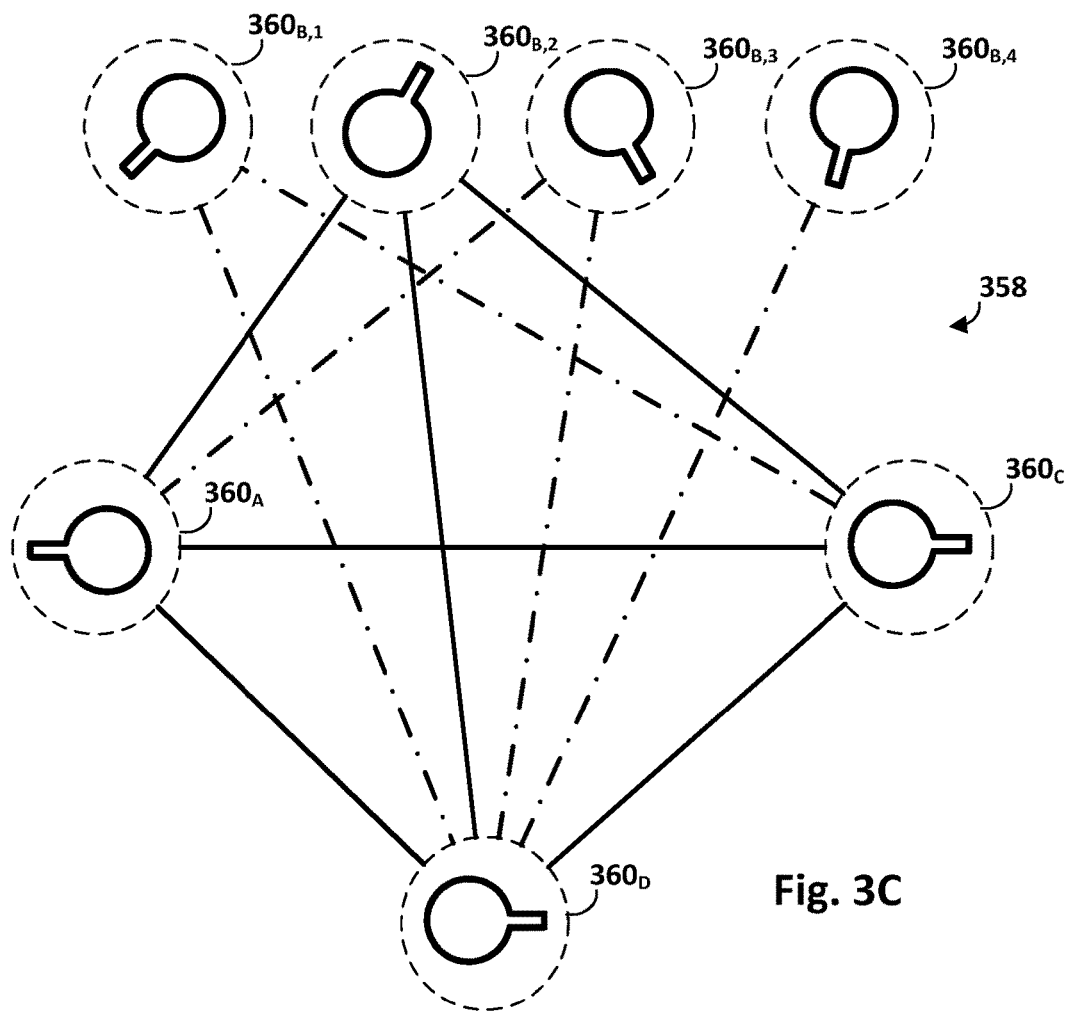

FIG. 3A depicts an example of how a robot/control system may perceive a group of four coffee cups, $352_{A-D}$, clustered together on a surface. For example, a camera on the robot may capture 2D or 3D image data from the perspective of FIG. 3A. Cups $352_A$, $352_C$, and $352_D$ are positioned (or are "posed") so that their handles are visible in the field of view. The handle of cup $352_B$, however, is not visible. FIG. 3B depicts an overhead view of cups $352_{A-D}$ that is not available to the robot/control system (it is only depicted for the reader's benefit). FIG. 3B demonstrates that a handle of cup $352_B$ is, in reality, oriented away from the other three cups, in an upward right direction in FIG. 3B. However, the orientation of the handle of cup $352_B$ is unknown to, for instance, object recognition client 122 and/or root object recognition engine 142.

To assist in determining a pose of cup $352_B$, object recognition client 122 and/or root object recognition engine 142 may be configured to identify a graph 358 of nodes $360_{X,Y}$, wherein X corresponds to the observed object (e.g., $352_A$, $352_B$, $352_C$, and $352_D$), and Y (when present) corresponds to a candidate pose inference returned from one or more targeted object recognition modules 146. For simplicity's sake, objects $352_{A-D}$ are homogenous, and so nodes 360 only represent candidate poses of those objects. However, it should be understood that nodes may also represent candidate object types associated with objects.

Because the handles of cups $352_A$, $352_C$, and $352_D$ are visible in FIG. 3A (and hence, known to object recognition client 122 and/or root object recognition engine 142), there is only a single node corresponding to each of these cups because the candidate poses represented by the nodes $360_A$, $360_C$, and $360_D$ likely have relatively high confidence measures. However, because the handle of cup $352_B$ is not visible in FIG. 3A (and hence, not known to object recognition client 122 and/or root object recognition engine 142), there are multiple nodes, $360_{B,1-4}$, representing four candidate poses of cup $352_B$.

Inside each node of graph 358 is an overhead profile of the respective inferred cup pose showing its inferred handle position. Nodes of graph 358 are connected to each other by a plurality of of edges. Each edge may indicate a lack of collision between inferred poses/object types represented by the nodes the edge connects. There is a "lack of collision" between inferred poses/object types when, taking the inferred poses/object types to be true, two or more objects to which the inferences are directed would not simultaneously occupy the same space.

For example, there is no collision between the first candidate pose $360_{B,1}$ associated with first cup $352_B$ and the candidate poses $360_C$ and $360_D$ associated with cups $352_C$ and $352_D$, respectively, because the handle of cup $352_B$ in first candidate pose $360_{B,1}$ would not occupy the same space as either cup $352_C$ or cup $352_D$. Accordingly, nodes representing these candidate poses are connected by edges. However, there is a collision between the first candidate pose $360_{B,1}$ associated with first cup $352_B$ and the candidate pose $360_A$ associated with first cup $352_A$ because the handle of cup $352_B$ would occupy at least some of the same space as cup $352_A$. Accordingly, nodes representing these candidate poses are not connected by edges.

Likewise, there is a collision between the third candidate pose $360_{B,3}$ associated with first cup $352_B$ and the candidate pose $360_C$ associated with third cup $352_C$ because the handle of cup $352_B$ in third candidate pose $360_{B,3}$ in candidate pose $360_B$ would occupy at least some of the same space as cup $352_C$. Thus, the nodes representing third candidate pose $360_{B,3}$ and candidate pose $360_C$ are not connected by an edge. And fourth candidate pose $360_{B,4}$ associated with cup $352_B$ would collide with both candidate pose $360_A$ associated with cup $352_A$ and candidate pose $360_C$ associated with cup $352_C$. Accordingly, the node representing fourth candidate pose $360_{B,4}$ is only connected to the node representing candidate pose $360_D$ associated with cup $352_D$.

On the other hand, there are no collisions between second candidate pose $360_{B,2}$ associated with cup $352_B$ and any of candidate poses $360_A$, $360_C$, or $360_D$. Consequently, there is a subgraph of graph 358 that represents a so-called "maximum clique" of nodes that are each connected to all other nodes of the subgraph (and thus do not present any collisions). This subgraph is indicated by nodes connected by the solid edges (as opposed to the dash-dot-dash edges), and includes the nodes indicated at $360_A$, $360_{B,2}$, $360_C$, and 360$_D$. In various implementations, object recognition client 122 (or another component such as root object recognition server 142) may select such a maximum clique of nodes as the best guess of object types/poses of multiple observed objects. Various known techniques may be used to identify a maximum clique of nodes, such as the Bron-Kerbosch algorithm.

In the example of FIG. 3, the objects in question are homogenous. However, this is not required. Indeed, in many scenarios there may be a plurality of heterogeneous objects that may require object type/pose identification. Moreover, in such scenarios, one or more object type inferences may raise conflicts. Nonetheless, the techniques described above may be employed to identify a maximum clique subgraph (i.e., the subgraph having the most nodes representing object type inferences that do not raise conflicts). The object type inferences represented by the nodes of the maximum clique subgraph may be accepted as the best available.

Figure 4:
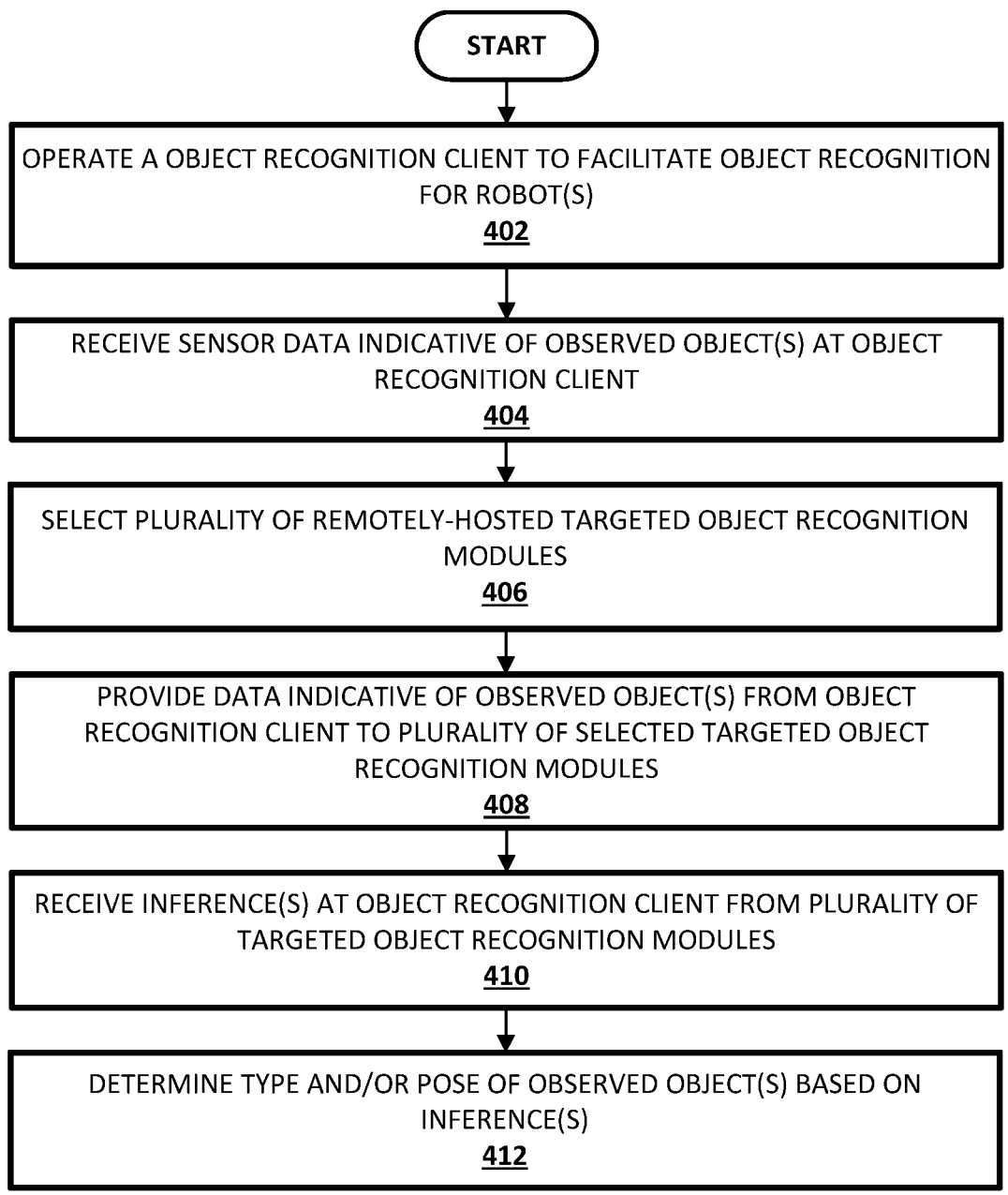
FIG. 4 depicts an example method in accordance with various implementations.

Referring now to FIG. 4, an example method 400 of delegating object type and/or pose detection to a plurality of targeted object recognition modules is described. For convenience, the operations of the flowchart are described with reference to a system that performs the operations. This system may include various components of various computer systems. For instance, some operations may be performed at robot 100, while other operations may be performed by one or more components of control system 120 and/or object recognition system 140. Moreover, while operations of method 400 are shown in a particular order, this is not meant to be limiting. One or more operations may be reordered, omitted or added.

At block 402, the system may operate an object recognition client, e.g., on robot 100 (e.g., 122B), on a local control system 120 (e.g., 122A), or elsewhere, to facilitate object recognition for one or more robots. At block 404, object recognition client 122 may receive from one or more sensors, e.g., a 2D and/or 3D vision sensor on the robot or elsewhere, sensor data indicative of one or more observed objects in the environment. As this point these observed objects may not yet be classified with particular object types or poses.

At block 406, the system may select a plurality of targeted object recognition modules 146 that are likely applicable to the yet-unknown observed object. These targeted object recognition modules 146 may be selected based on various signals. In some implementations, the signals may include the sensor data received at block 404. In some implementations, the signals may include one or more attributes of a task to be performed by the robot. For example, if the robot is to perform a task in a child's room, targeted object recognition modules 146 associated with objects commonly found in children's rooms, such as books, toys, and games, may be selected. As noted above, the targeted object recognition modules may be selected by root object recognition server 142 and/or by object recognition client 122.

At block 408, the system may provide data indicative of the one or more observed objects to the plurality of targeted object recognition modules 146 selected at block 406. As noted above, this data indicative of the one or more observed objects may include 2D or 3D data obtained from a vision sensor, one or more "soft-classifiers," location data associated with the robot and/or observed object, and so forth. And as was also noted above, in some implementations, object recognition client 122 may provide this data to root object recognition server 142 so that root object recognition server 142 can provide the data to the plurality of targeted object recognition modules 146. In other implementations, object recognition client 122 may itself provide the data directly to the targeted object recognition modules. At block 410, object recognition client 122 may receive one or more inferences from the plurality of targeted object recognition modules 146. These inferences may include inferences about poses and/or object types of the one or more observed objects in the environment.

At block 412, the system may determine information about the one or more observed objections, such as object types and/or poses, based on the one or more inferences received from targeted object recognition modules 146 at block 410. As described above, conflicts between inferences may be resolved using various signals and/or techniques. In some cases, object recognition client 122 and/or root object recognition engine 142 may select one inference from a plurality of competing inferences based on confidence measures associated with the plurality of competing inferences. In other implementations, object recognition client 122 and/or root object recognition engine 142 may resolve competing inferences for one observed object by detecting collisions that would be created between the competing inferences and inferences associated with other observed objects, as was described above with regard to FIG. 4.

Figure 5:
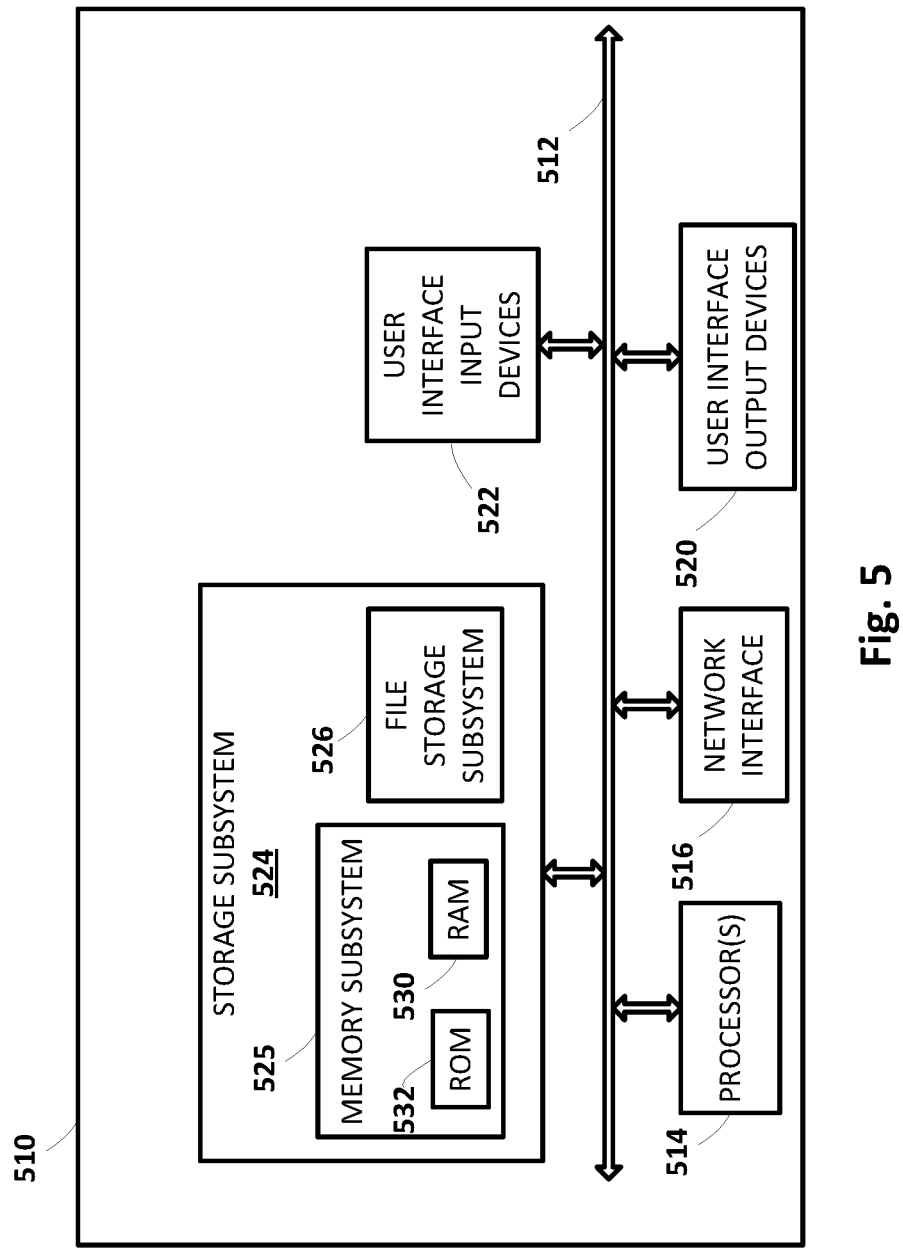
FIG. 5 schematically depicts an example architecture of a computer system.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to perform selected aspects of method 400, and/or to implement one or more aspects of robot 100, control system 120, or remote object recognition system 140. Memory 525 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a CD-ROM drive, an optical drive, or removable media cartridges. Modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, smart phone, smart watch, smart glasses, set top box, tablet computer, laptop, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors of a robot, comprising:
operating an object recognition client onboard the robot to facilitate object recognition for the robot;
receiving, by the object recognition client, sensor data indicative of one or more observed physical objects in a physical environment;
providing, by the object recognition client, to one or more online computing devices operating remotely from the one or more processors, data indicative of the one or more observed physical objects;
receiving, by the object recognition client, from one or more of the online computing devices, a plurality of inferences about object types of the one or more observed physical objects, wherein the plurality of inferences are based on the data indicative of the one or more observed physical objects provided by the object recognition client to the one or more online computing devices;
determining, by the object recognition client, based at least in part on two or more confidence measures associated with two or more of the plurality of inferences relating to the same physical object of the one or more observed physical objects, that the two or more inferences are in conflict; and
disambiguating, by the object recognition client, between the two or more conflicting inferences based on one or more offline resources that are available to the robot locally while the robot is not in network communication with the one or more online computing devices.

2. The method of claim 1, wherein the disambiguating comprises:
comparing the two or more conflicting inferences to an inventory of objects known to be owned by an operator of the robot; and
selecting from the two or more conflicting inferences based on the comparing.

3. The method of claim 1, wherein the disambiguating comprises:
comparing at least some of the sensor data to two or more canonical models associated with the two or more conflicting inferences; and
selecting from the two or more conflicting inferences based on the comparing.

4. The method of claim 3, further comprising rendering two or more canonical objects based on the two or more canonical models, wherein the comparing includes comparing the two or more canonical objects with the at least some of the sensor data.

5. The method of claim 4, wherein the rendering comprises rendering the canonical objects in poses indicated in one or more pose inferences received by the object recognition client from one or more of the online computing devices.

6. The method of claim 4, wherein the rendering is based on computer-aided designs ("CAD") representing the two or more canonical objects.

7. The method of claim 3, wherein the comparing includes comparing an opaqueness of the two or more canonical models with an opaqueness observed in the same physical object.

8. The method of claim 1, wherein the disambiguating comprises:
determining a time of day at which the sensor data was received by the object recognition client; and
selecting from the two or more conflicting inferences based on the time of day.

9. A robot comprising one or more processors and memory operably coupled with the one or more processors, wherein the memory stores instructions that, in response to execution of the instructions by one or more processors, cause the one or more processors to perform the following operations:
operating an object recognition client onboard the robot to facilitate object recognition for the robot;
receiving, by the object recognition client, sensor data indicative of one or more observed physical objects in a physical environment;
providing, by the object recognition client, to one or more online computing devices operating remotely from the one or more processors, data indicative of the one or more observed physical objects;

receiving, by the object recognition client, from one or more of the online computing devices, a plurality of inferences about object types of the one or more observed physical objects, wherein the plurality of inferences are based on the data indicative of the one or more observed physical objects provided by the object recognition client to the one or more online computing devices;

determining, by the object recognition client, based at least in part on two or more confidence measures associated with two or more of the plurality of inferences relating to the same physical object of the one or more observed physical objects are in conflict; and disambiguating, by the object recognition client, between the two or more conflicting inferences based on one or more offline resources that are available to the robot locally while the robot is not in network communication with the one or more online computing devices.

10. The system of claim 9, wherein the disambiguating comprises:

comparing the two or more conflicting inferences to an inventory of objects known to be owned by an operator of the robot; and selecting from the two or more conflicting inferences based on the comparing.

11. The system of claim 9, wherein the disambiguating comprises:

comparing at least some of the sensor data to two or more canonical models associated with the two or more conflicting inferences; and selecting from the two or more conflicting inferences based on the comparing.

12. The system of claim 11, further comprising rendering two or more canonical objects based on the two or more canonical models, wherein the comparing includes comparing the two or more canonical objects with the at least some of the sensor data.

13. The system of claim 12, wherein the rendering comprises rendering the canonical objects in poses indicated in one or more pose inferences received by the object recognition client from one or more of the online computing devices.

14. The system of claim 12, wherein the rendering is based on computer-aided designs ("CAD") representing the two or more canonical objects.

15. The system of claim 11, wherein the comparing includes comparing an opaqueness of the two or more canonical models with an opaqueness observed in the same physical object.

16. The system of claim 9, wherein the disambiguating comprises:

determining a time of day at which the sensor data was received by the object recognition client; and selecting from the two or more conflicting inferences based on the time of day.

17. At least one non-transitory computer-readable medium comprising instructions that, in response to execution of the instructions by one or more processors, cause the one or more processors to perform the following operations:

operating an object recognition client onboard a robot to facilitate object recognition for the robot;

receiving, by the object recognition client, sensor data indicative of one or more observed physical objects in a physical environment;

providing, by the object recognition client, to one or more online computing devices operating remotely from the one or more processors, data indicative of the one or more observed physical objects;

receiving, by the object recognition client, from one or more of the online computing devices, a plurality of inferences about object types of the one or more observed physical objects, wherein the plurality of inferences are based on the data indicative of the one or more observed physical objects provided by the object recognition client to the one or more online computing devices;

determining, by the object recognition client, based at least in part on two or more confidence measures associated with two or more of the plurality of inferences relating to a given physical object of the one or more observed physical objects are in conflict; and disambiguating, by the object recognition client, between the two or more conflicting inferences based on one or more offline resources that are available to the robot locally while the robot is not in network communication with the one or more online computing devices.

18. The at least one non-transitory computer-readable medium of claim 17, wherein the disambiguating comprises:

comparing the two or more conflicting inferences to an inventory of objects known to be owned by an operator of the robot; and selecting from the two or more conflicting inferences based on the comparing.

19. The at least one non-transitory computer-readable medium of claim 17, wherein the disambiguating comprises:

comparing at least some of the sensor data to two or more canonical models associated with the two or more conflicting inferences; and selecting from the two or more conflicting inferences based on the comparing.

20. The at least one non-transitory computer-readable medium of claim 19, further comprising instructions for rendering two or more canonical objects based on the two or more canonical models, wherein the comparing includes comparing the two or more canonical objects with the at least some of the sensor data.

* * * * *